Figure 1:
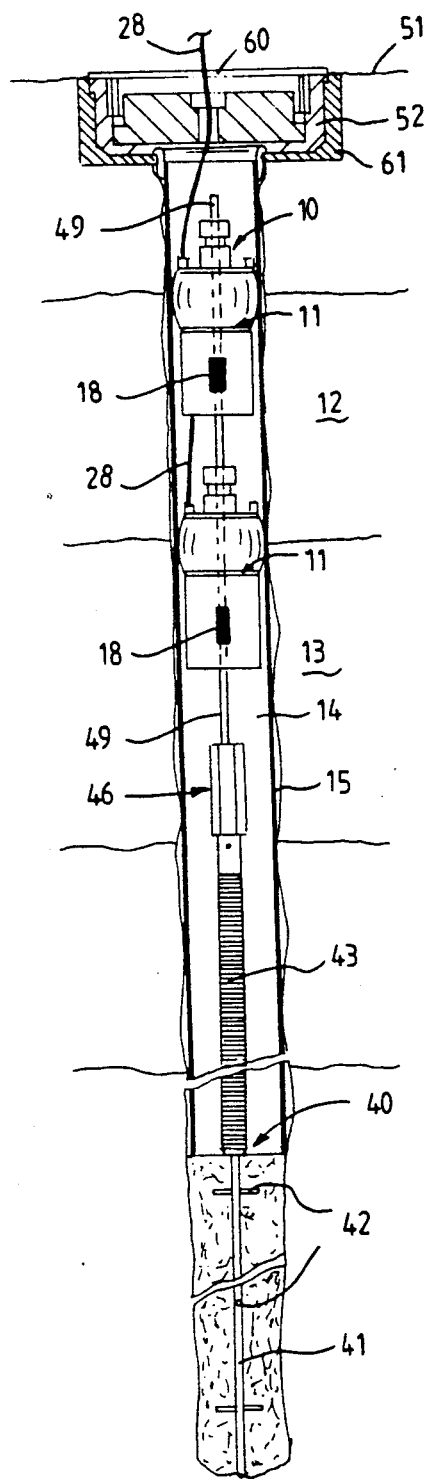

United States Patent [19]

Basson et al.

[11] Patent Number: 5,046,366

[45] Date of Patent: Sep. 10, 1991

[54] APPARATUS FOR MEASURING DEFLECTION OR DEFORMATION IN PAVEMENT STRUCTURES

[75] Inventors: John E. B. Basson; Daniel F. Botha; Otto J. Wijnberger, all of Pretoria, South Africa

[73] Assignee: CSIR, Pretoria, South Africa

[21] Appl. No.: 489,822

[22] Filed: Mar. 9, 1990

[30] Foreign Application Priority Data

Mar. 9, 1989 [ZA] South Africa ............... 89/1806

[51] Int. Cl.⁵ ............................................. G01N 3/00
[52] U.S. Cl. ..................................................... 73/784
[58] Field of Search ............... 73/784, 786; 33/1 H, 33/302, 788, 789, 624, 544–544.4; 166/206–208; 340/690

[56] References Cited

U.S. PATENT DOCUMENTS

| | | | |
|---|---|---|---|
| 3,380,167 | 4/1968 | Abel, Jr. et al. | 33/1 H |
| 3,419,080 | 12/1968 | Lebourg | 166/207 |
| 3,538,608 | 11/1970 | Bronson | 33/1 H |
| 3,562,916 | 2/1971 | Duckworth | 73/784 |
| 4,649,741 | 3/1987 | Strom | 73/784 |
| 4,719,803 | 1/1988 | Capelle et al. | 73/784 |

FOREIGN PATENT DOCUMENTS

| | | |
|---|---|---|
| 0263626 | 4/1988 | European Pat. Off. |
| 2042192 | 9/1980 | United Kingdom |
| 2183845 | 6/1987 | United Kingdom |

OTHER PUBLICATIONS

National Institute for Transport and Road Research etc.; "The Multi-Depth Deflectometer: A Multistage Sensor, etc." Basson et al., Feb. 1981.

"The Multi-Depth Deflector, etc.", by Morris de Beer et al. Paper accepted for the first International Symposium on nondestructive testing, etc.

"Effective Moduli and Stress Dependence of Payment Materials as Measured in Some Heavy-Vehicle Simulator Tests" by J. H. Maree et al.

"Field Evaluation of the Multi-Depth Deflectometers'-'—Search Report 1123-2 by T. Scullion et al., Report date Sep. 1988.

"Use of Multidepth Deflector for Deflection Measurements" by Tom Scullion and A. J. Bush.

"Using the Multidepth Deflectomer to Verify Modulus Backcalculation Procedures" by Tom Scullion et al.

Primary Examiner—Robert Raevis
Attorney, Agent, or Firm—Nixon & Vanderhye

[57] ABSTRACT

A system 10 for measuring deflection and/or deformation of a layer in a pavement structure under load is disclosed and claimed. The system comprises at least one apparatus 11 including electric coils 17 sensitive to relative movement between them and a separately anchored body 18 of ferromagnetic material. The apparatus 11 comprises two longitudinally spaced relatively moveable discs 19, 22 and a body 21 of a resilient, transversely expandable material between the discs. A nut 25 serves to urge the discs 19, 22 towards one another thereby causing the body 21 transversely to expand to secure the apparatus at a predetermined depth against a wall in a test hole.

10 Claims, 4 Drawing Sheets

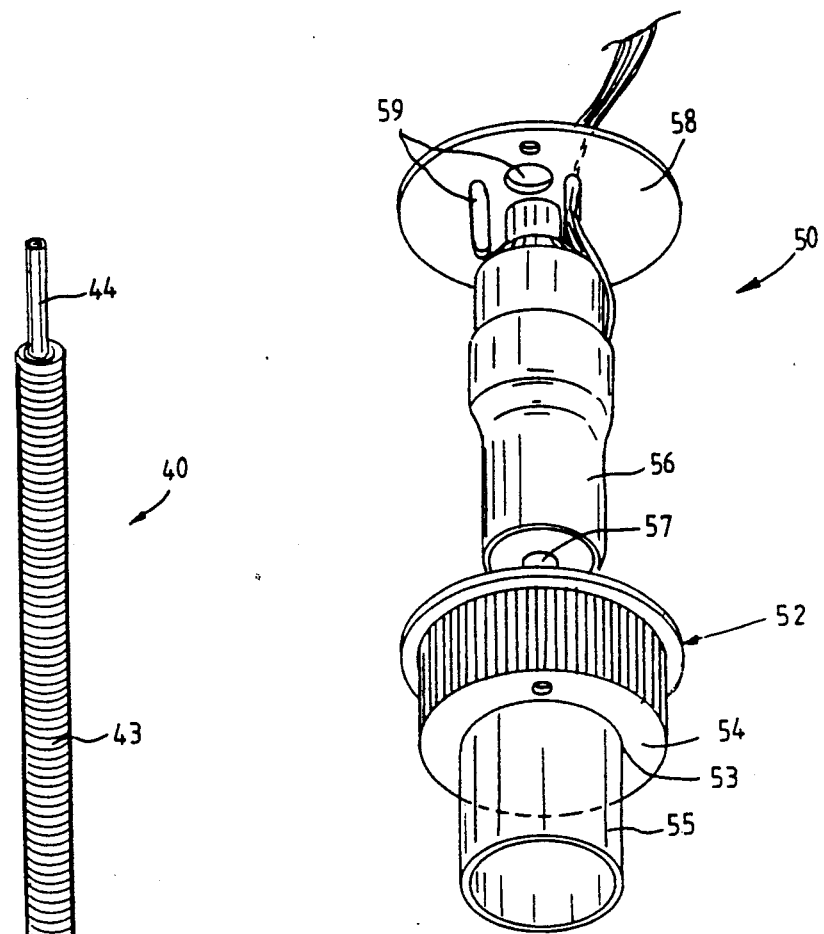
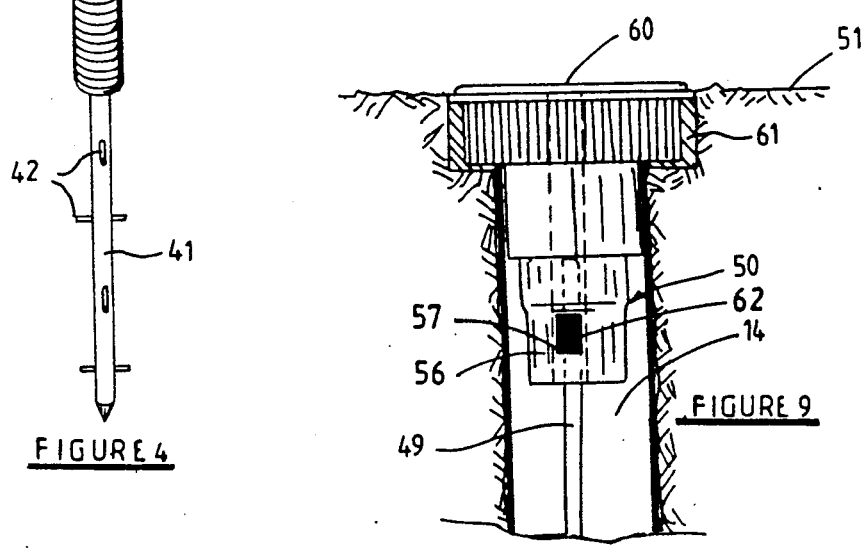

APPARATUS FOR MEASURING DEFLECTION OR DEFORMATION IN PAVEMENT STRUCTURES

This invention relates to road or pavement engineering and more particularly to apparatus for and a method of measuring transient deflection and permanent deformation of different layers in a pavement structure.

With the availability of the so-called Heavy Vehicle Simulator it has become possible to simulate many years of trafficing on a test section of pavement structure over a relatively short period of two to three months. The pavement's response to this simulated trafficing was initially monitored by measuring total surface deflection, radius of curvature and permanent deformation. The interpretation of these measurements proved difficult in multi-layered pavement structures as more detailed information is required on the response of each layer in the structure.

In a prior published document there is disclosed a system wherein apparatus comprising means sensitive to relative movement between itself and a separately anchored member is secured to a wall of a test hole by means of an assembly comprising a circular member having a conical surface, a spaced circular member having a planar surface, a plurality of steel balls between the two members and a peripheral elastic sleeve between the members. By urging the two members towards one another, the balls are urged radially outwardly to bear against the wall of the hole, thereby to suspend the apparatus in the hole.

The main disadvantage of this system is that the contact made with the wall of the hole is not continuous along the whole of the periphery of the assembly, but rather a plurality of point contacts where each ball bears against the wall. This may result in the apparatus becoming misaligned in the hole, especially if only one or more adjacent balls bear against a hard object in the wall. Furthermore, the aforementioned apparatus is expensive and difficult to manufacture.

It is an object of the present invention to provide an improved system for measuring the response of various vertically spaced layers in a pavement structure under load.

According to the invention a system for measuring deflection and/or deformation of a layer in a pavement structure under load comprises:

apparatus comprising electronic means sensitive to relative movement between itself and a separately anchored member;

the apparatus also comprising means for securing the sensitive means in a hole in the structure in a region close to the layer;

the securing means being connected to the sensitive means and comprising two longitudinally spaced, relatively moveable circular disc-like members and a circular cylindrical body of a resilient, transversely expandable material sandwiched between the spaced members;

the apparatus further comprising means actuable to urge the two members towards one another causing the body transversely to expand beyond the peripheries of the disc-like members thereby to secure the sensitive means against a wall of the hole;

the disc-like members and circular cylindrical body defining at least one longitudinally extending peripheral slot;

the apparatus also comprising ducting for electric wiring extending from the sensitive means, the ducting being located in the peripheral slot to extend from the sensitive means to the disc-like member furthest away from the sensitive means; and the separate member, in use, being anchored in the structure in a region thereof that does not deflect under the load so that relative movement between the stationary separate member and the sensitive means secured to the layer may be measured.

It will be appreciated that with the body of ferromagnetic material associated with the apparatus anchored in the hole to limit movement thereof transversely to the surface of the pavement during use, the sensitive means, which is secured to a layer as hereabove defined, will give an indication of the deflection of the layer under load, relative to the anchor and also of any permanent deformation of such layer.

Furthermore, a plurality of the apparati according to the invention may be secured in the hole spaced above one another and to different layers in the pavement to provide deflection and/or deformation indications of each of these layers.

The sensitive means may be covered with a protective jacket, the disc-like member and jacket may be of substantially equal diameter and the jacket may also define a longitudinal peripheral slot for the ducting.

The disc-like members, resilient body and jacket may define two diametrially opposed slots wherein two opposed ducts may be mounted so that the outer surfaces of the ducts are substantially flush with the peripheries of the disc-like members.

The sensitive means preferably comprises coils of a linear variable differential transformer and the separate member preferably comprises a body of a ferromagnetic material.

The coils are preferably located in an elongate bored housing; the two disc-like members and resilient body define holes and a bore, respectively registering with the bore of the housing and the body of ferromagnetic material, in use, is carried on a rod extending through the registering bores so that the body of ferromagnetic material is positioned in the bore of the housing in the region of the coils.

A first of the disc-like members may be mounted on the housing for the coils, a hollow threaded stem may be secured to the first disc-like member with the stem communicating with the hole in the first member and extending through the bore defined in the resilient body and the hole in the second disc-like member; and the actuating means may comprise a nut co-operating with the thread on the stem.

The resilient body is preferably glued to the two disc-like members.

The nut preferably defines two diametrically opposed radially extending slots and the system may comprise a tool for gripping the apparatus and for actuating the nut. The tool may comprise an inner elongate rotatable member comprising two diametrically opposed projections at one end thereof adapted to be received in the slots in the nut and means for rotating the member towards the other end thereof; a coaxial outer sleeve moveable on the inner member in telescopic fashion; and jaws mounted between the inner member and outer sleeve actuable by longitudinal movement of the outer sleeve to open and close, thereby to release or grip the apparatus.

The system may also comprise anchor for anchoring the rod in the bottom of the hole, the anchor comprising an elongate leading portion having transversely extending projections thereon, a tail portion and a yieldable bellows member co-axially mounted on the anchor to protect the tail portion against matter that may fall into the hole, thereby to prevent disturbance of the anchor.

The system may further comprise a top cap assembly for closing the hole, the top cap assembly comprising a cup mountable in the hole at the mouth thereof, and apparatus including means sensitive to relative movement between itself and a separately anchored member mountable in or on the cup and a lid for the cup.

Figures 2, 3:
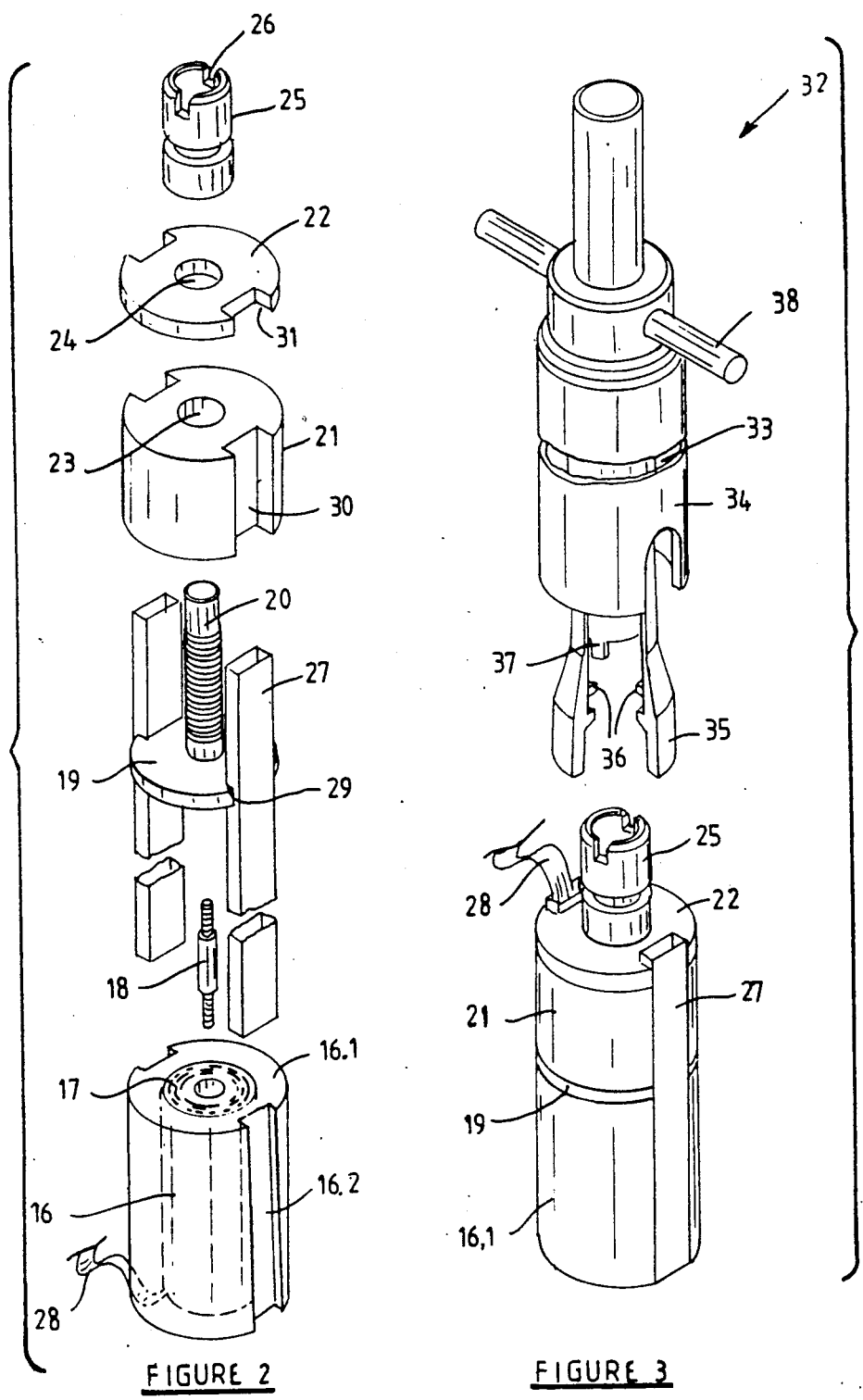
Figure 5:
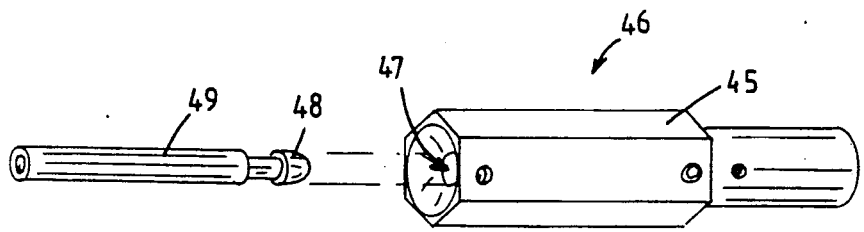
Figure 6:
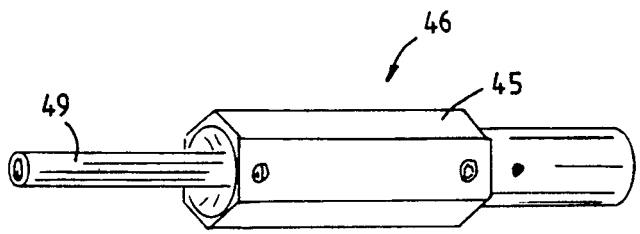
Figure 7:
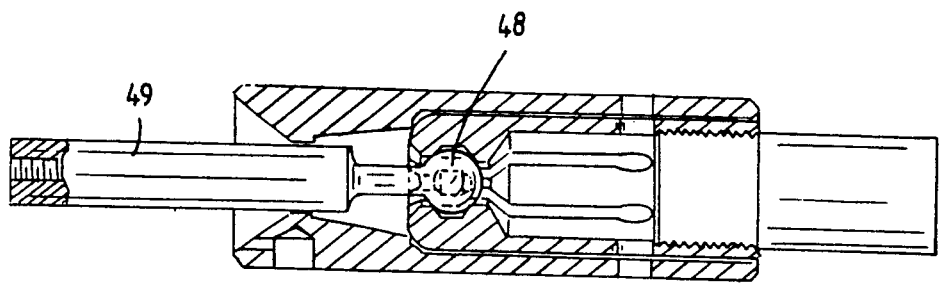

The invention will now further be described, by way of example only, with reference to the accompanying diagrams wherein:

FIG. 1: is a diagrammatic side elevation of a system for measuring the deflection and/or deformation of a plurality of layers in a pavement structure under load, mounted in a test hole drilled in the pavement structure;

FIG. 2: is an exploded perspective view of apparatus for measuring the deflection and/or deformation of a layer in the structure under load;

FIG. 3: is a perspective view of the apparatus of FIG. 2 fully assembled and also showing an installation tool for securing the apparatus at a predetermined level in the test hole;

FIG. 4: is a diagrammatic view of an anchor for a rod carrying bodies of ferromagnetic material associated with the apparati for measuring the deflection and/or deformation;

FIGS. 5 to 7: are various views of a connection between the rod and the anchor;

FIG. 8: is a diagrammatic perspective view of an alternative top cap assembly for the test hole including apparatus for measuring the deflection and/or deformation of a region of the structure close to the surface thereof; and FIG. 9: is a diagrammatic side elevation of the top cap assembly mounted in the hole to close the hole.

A system for measuring the deflection and/or deformation of a plurality of layers at different levels in a pavement structure under load, is generally designated by the reference numeral 10 in FIG. 1.

The system 10 comprises two (or any other suitable number) apparati 11 for measuring the deflection and/or deformation of layers 12 and 13, respectively in the structure, mounted at different, predetermined levels in a test hole 14.

Hole 14 is 35 to 40 mm in diameter and is lined with a neoprene sleeve 15. Sleeve 15 serves to ensure stability of both the hole and the system 10 during accelerated testing by means of a Heavy Vehicle Simulator (not shown). The Heavy Vehicle Simulator is a structure with which many years of trafficing over a test section of the pavement structure may be simulated over a relatively short period of two to three months.

Apparati 11 are secured to the inner wall of the hole 14 as will be described herebelow.

As best shown in FIG. 2, each apparatus 11 comprises a linear variable differential transformer (LVDT) comprising a bored circular cylindrical housing 16 for transformer coils 17 sensitive to movement of a separate body of ferromagnetic material 18 relative thereto.

The E-series LVDT's sold by SHAEVITZ ENGINEERING have been found to be suitable for the purposes of the invention. As will be described herebelow, the body 18, in use, is anchored in the hole 14 so that it is positioned in the bore of housing 16. Housing 16 is enclosed in an epoxy jacket 16.1, defining two diametrically opposed slots 16.2.

A first disc like member 19 defining a centre hole (not shown) and supporting a hollow threaded stem 20 communicating with the hole is mounted on one end of the housing 16. A circular cylindrical body 21 of a resilient, transversely expandable material, such as silicon rubber, is located between and glued to the first disc 19 and a second similar disc 22. The stem 20 passes through a bore 23 defined in the body 21 and a hole 24 defined in the second disc 22.

A threaded nut 25 serves to co-operate with the thread on the stem 20 to urge second disc 22 towards or away from first disc 19, thereby to cause the body 21 transversely to expand or to return to its normal configuration. When the nut 25 is tightened, body 21 is caused to expand thereby to secure and suspend the apparatus 11 in hole 14. With the resilient body 21 of the present invention, there is a continuous contact area between the apparatus 11 and the wall and the forces suspending the apparatus 11 in the hole are substantially uniform along the whole of the periphery of body 21. Nut 25 defines diametrically opposed peripheral slots 26 adapted to co-operate with complementary formations 37 (shown in FIG. 3) on an installation tool 32 as will be described herebelow.

Diametrically opposed and longitudinally extending ducts 27 for electrical wiring 28 connected to the coils 17 in housing 16 are also provided on apparatus 11. Ducts 27 are located in diametrically opposed peripheral slots 29 to 31 defined in disc 19, collar 21 and disc 22 respectively and in slots 16.2 of epoxy jacket 16.1.

Apparati 11 are located and secured in hole 14 by means of installation tool 32 shown in FIG. 3. Tool 32 comprises an inner elongate rotatable member 33. An outer sleeve 34 is co-axially mounted on inner member 33 and is moveable in telescopic fashion in a longitudinal direction relative to inner member 33. Jaws 35 are mounted between sleeve 34 and member 33 to project beyond one end thereof and to be moveable transversely inwardly and outwardly relative to member 33 upon telescopic manipulation of sleeve 34. The outer surfaces of jaws 35 are sloped and gripping formations 36 are provided on the inner surfaces. Formations 37 on the one end of member 33 are adapted to co-operate with slots 26 on nut 25 of apparatus 11. A tommy bar 38 is provided towards the other end of member 33 to enable rotation of the latter relative to sleeve 34.

In use, sleeve 34 is moved away from the one end of member 33 thereby to cause jaws 35 to move outwardly toward their normal rest position. Apparatus 10 is then positioned between jaws 35 with formations 37 received in slots 26. Sleeve 34 is moved towards the one end of member 33 to close the jaws and to grip the apparatus between jaws 35.

The apparatus is then positioned at the desired level in hole 14, nut 25 is tightened by rotating inner member 33 by means of tommy bar 38. Expandable body 21 is caused transversely to expand and to secure apparatus 11 in a suspended condition in hole 14.

Referring again to FIG. 1, the bodies 18 of apparati 11 are supported in the hole 14 by an anchor 40. As best shown in FIG. 4 anchor 40 comprises an enlongate member having a sharpened leading portion 41 with transversely projecting formations 42 thereon and a tail 44. A yieldable bellows-like sleeve 43, coaxially mounted on the elongate member, protects the regions of tail 44 covered thereby against matter that may fall into the hole to prevent the anchor from being disturbed.

A socket defining member 45 of a connector 46 shown in FIGS. 5 to 7 is connected to tail 44 of anchor 40. A male member adapted to fit into socket 47 in snap fit fashion is designated by the reference numeral 48. This member is provided at the one or bottom end of a rod 49 for carrying bodies 18 at selected positions along its length as best shown in FIG. 1.

It will be appreciated that with the bodies 18 supported by rod 49 which is anchored by anchor 40 at a level approximately two meters below the surface of the pavement, where little or no deflection under load is expected, the apparati 11, suspended between the walls of the hole, may move relative to the bodies 18 under the influence of a load.

The LVDT's are adapted to sense this relative movement and to transmit information relating to any deflection or deformation via wiring 28 to recording apparatus (not shown) above the surface of the pavement.

A top cap assembly carrying a LVDT, such as those referred to hereabove, is designated generally by the reference numeral 50 in FIGS. 8 and 9. This top cap assembly is different from the top cap shown in FIG. 1 and is intended to measure deflections and/or deformations close to the surface 51 of the pavement.

The top cap assembly comprises a cup 52 defining a hole 53 circumscribed by a flange 54. A sleeve 55 with a flange (not shown) extends through hole 53 with the flange abutting against flange 54 of the cup 52 on the inside thereof.

A coil carrying housing 56 of the aforementioned LVDT and which defines a bore 57 is secured to a suspending member in the form of a disc 58 adapted to fit into cup 52 and to abut against the flange of the sleeve 55. Disc 58 defines a plurality of holes and slots 59 through which the wiring 28 of all the apparati 11 in the hole pass to the aforementioned recording apparatus. Anchored rod 49 carries a body 62 of ferromagnetic material associated with the LVDT of the top cap assembly toward at its upper end so that the body 62 extends into bore 57 of housing 56 and is thus anchored separately from the coil carrying housing 56.

A lid 60 mountable on cup 52 closes off the hole 14 and should be flush with the top surface 51 of the pavement.

The system of FIG. 1 is installed as follows.

First the hole 14 is drilled. The depth of the hole may vary between a few centimeters and four meters and the diameter is in the order of 35-39 mm. The top part of the pavement structure (also shown in FIG. 9) is cut to have a diameter of 90 mm by 22 mm deep. The cup portion 52 of the top cap assembly, either that shown in FIG. 1 or the assembly 50 of FIGS. 8 and 9, is located in this region by embedding it in a polyurethane bedding compound 61. In yet other embodiments, the cup assembly may in situ be cast from polyurethane.

Next the leading portion 41 of anchor 40 is secured in the bottom of the hole 14 with a mixture of cement and coarse river sand. A pre-formed neoprene tube, which will form lining 15, is inserted by means of a metal tube covered with a suitable anti-bonding agent, such as silicon grease. A polyurethane compound is then poured into the annular region between the neoprene tube and the walls of hole 14. The mixture is then allowed to set and the metal tube withdrawn from the hole.

The socket portion 45 of connector 46 is next secured to anchor 40. A pilot rod (not shown) is then fitted into socket 47. This rod serves to guide the apparati 11 into their selected positions.

Starting with the apparatus 11 to be mounted deepest in the hole these apparati are secured, one after the other, at selected levels to the walls of hole 14 by means of tool 32, as hereabove described.

As shown in FIG. 1, the apparati 11 are connected via wiring 28 passing through the ducts 27 of apparati higher up in the hole to the aforementioned recording apparatus.

A dummy rod (also not shown) carrying a body of ferromagnetic material is passed through the registering stems 20 and bores of the housings 16 and is used to test each of the apparati. This rod is also used to measure the exact depth of each apparatus 11 below the surface. These measurements are used in assembling rod 49 for carrying bodies 18 at the measured intervals along its length.

The assembled rod 49 is then passed through the aforementioned registering stems and bores in apparati 11 and snapped into socket 47. The ferromagnetic body 18 of each LVDT is positioned in the bore of housing 16 of that LVDT. After calibration and final inspection of the arrangement, the hole 14 is closed by means of lid 60.

With the apparatus 11 and the system 10 according to the invention, it is possible to measure the deflections, changes in deflection, permanent deformation and changes in permanent deformation of the different layers in a pavement structure. From the deflections of the various layers it is also possible to back calculate the "effective" elastic moduli of the various layers. The term "effective" is used to distinguish the elastic moduli measured in the laboratory from those determined indirectly with the system 10 according to the invention. The back calculation is performed by using a multi-layered linear elastic computer programme where the user repeatedly changes the moduli of the layers until a depth deflection curve similar to that measured with the system is found. Usually an acceptable fit is achieved when the deviation from each deflection measurement is less than 0,0015 mm.

It will be appreciated that there are many variations in detail possible on the invention herein disclosed without departing from the scope and spirit of the appended claims

We claim:

1. A system for measuring deflection and/or deformation of a layer in a pavement structure under load comprising:

apparatus comprising electronic means sensitive to relative movement between itself and a separately anchored member;

the apparatus also comprising means for securing the electronic sensitive means in a hole in the structure in a region close to the layer;

the securing means being connected to the electronic sensitive means and comprising two longitudinally spaced, relatively moveable circular disc-like members and a circular cylindrical body of a resilient, transversely expandable material sandwiched between the spaced members;

the apparatus further comprising means actuable to urge the two members towards one another causing the body transversely to expand beyond the peripheries of the disc-like members thereby to secure the electronic sensitive means against a wall of the hole;

the disc-like members and circular cylindrical body defining at least one longitudinally extending peripheral slot;

the apparatus also comprising ducting for electric wiring extending from the electronic sensitive means, the ducting being located in the peripheral slot to extend from the electronic sensitive means to the disc-like member furthest away from the electronic sensitive means; and the separately anchored member, in use, being anchored in the structure in a region thereof that does not deflect under the load so that relative movement between the stationary separately anchored member and the electronic sensitive means secured to the layer may be measured.

2. A system as claimed in claim 1 wherein the electronic sensitive means is covered with a protective jacket, wherein the disc-like members and jacket are of substantially equal diameter and wherein the jacket also defines a longitudinal peripheral slot for the ducting.

3. A system as claimed in claim 2 wherein the disc-like members, resilient body and jacket define two diametrically opposed slots wherein two opposed ducts are mounted; and wherein outer surfaces of the ducts are substantially flush with the peripheries of the disc-like members.

4. A system as claimed in claim 1 wherein the electronic sensitive means comprises coils of a linear variable differential transformer and the separately anchored member comprises a body of a ferromagnetic material.

5. A system as claimed in claim 4 wherein the coils are located in an elongate bored housing; wherein the two disc-like members and resilient body define holes and a bore, respectively registering with the bore of the housing and wherein the body of ferromagnetic material, in use, is carried on a rod extending through the registering bores so that the body of ferromagnetic material is positioned in the bore of the housing in the region of the coils.

6. A system as claimed in claim 5 wherein a first of the disc-like members is mounted on the housing for the coils, wherein a hollow threaded stem is secured to the first disc-like member, the stem communicating with the hole in the first member and extending through the bore defined in the resilient body and the hole in the second disc-like member; and wherein the means actuable to urge the two disc-like members towards one another comprises a nut co-operating with the thread on the stem.

7. A system as claimed in claim 6 wherein the nut defines two diametrically opposed radially extending slots and wherein the system comprises a tool for gripping the apparatus and for actuating the nut, the tool comprising an inner elongate rotatable member comprising two diametrically opposed projections at one end thereof adapted to be received in the slots in the nut and means towards the other end thereof for rotating the member; a coaxial outer sleeve moveable on the inner member in telescopic fashion; and jaws mounted between the inner member and outer sleeve actuable by longitudinal movement of the outer sleeve to open and close, thereby to release or grip the apparatus.

8. A system as claimed in claim 1 wherein the resilient body is glued to the two disc-like members.

9. A system as claimed in claim 5 comprising an anchor for anchoring the rod in the bottom of the hole, the anchor comprising an elongate leading portion having transversely extending projections thereon, a tail portion and a yieldable bellows member co-axially mounted on the anchor to protect the tail portion against matter that may fall into the hole, thereby to prevent disturbance of the anchor.

10. A system as claimed in claim 1 comprising a top cap assembly for closing the hole, the top cap assembly comprising a cup mountable in the hole at the mouth thereof, and apparatus including means sensitive to relative movement between itself and a separately anchored member mountable in or on the cup and a lid for the cup.

* * * * *